United States Patent
Itoh et al.

(10) Patent No.: US 10,310,246 B2
(45) Date of Patent: Jun. 4, 2019

(54) CONVERTER, ILLUMINATOR, AND LIGHT SHEET FLUORESCENCE MICROSCOPE

(71) Applicants: SCREEN HOLDINGS CO., LTD., Kyoto-shi, Kyoto (JP); The Board of Trustees of the Leland Stanford Junior University, Stanford, CA (US)

(72) Inventors: Ryosuke Itoh, Stanford, CA (US); Olav Solgaard, Stanford, CA (US); Stephen Sanborn Hamann, Stanford, CA (US)

(73) Assignees: Screen Holdings Co., Ltd., Kyoto (JP); The Board of Trustees of the Leland Stanford Junior University, Stanford, CA (US)

(*) Notice: Subject to any disclaimer, the term of this patent is extended or adjusted under 35 U.S.C. 154(b) by 0 days.

(21) Appl. No.: 15/466,930

(22) Filed: Mar. 23, 2017

(65) Prior Publication Data

US 2018/0088305 A1    Mar. 29, 2018

Related U.S. Application Data

(60) Provisional application No. 62/400,864, filed on Sep. 28, 2016.

(51) Int. Cl.
*G02F 1/153* (2006.01)
*G02F 1/29* (2006.01)
(Continued)

(52) U.S. Cl.
CPC ......... *G02B 21/08* (2013.01); *G02B 21/0032* (2013.01); *G02B 21/0076* (2013.01);
(Continued)

(58) Field of Classification Search
CPC ...... G02B 5/32; G02B 27/288; G02B 3/0056; G02B 5/0273; G02B 6/04; G02B 6/0005;
(Continued)

(56) References Cited

U.S. PATENT DOCUMENTS 8,970,950 B2 * 3/2015 Stelzer .................. G02B 21/06
359/385
9,223,125 B2 12/2015 Betzig
(Continued)

OTHER PUBLICATIONS

Keller et al., "Fast, high-contrast imaging of animal development with scanned light sheet-based structured-illumination microscopy", Nature Methods (US), 2010, vol. 7, Issue 8, pp. 637-642 and its online methods (doi:10.1038/nmeth.1476).
(Continued)

*Primary Examiner* — Brandi N Thomas
(74) *Attorney, Agent, or Firm* — McDermott Will & Emery LLP

(57) ABSTRACT

Improved image quality by structured illumination or pivoting illumination and faster image acquisition are both achieved. A line light enters first to fifth virtual pixels of a grating light valve, and first to fifth lights are emitted respectively from the first to fifth virtual pixels. The intensities and phases of the first to fifth 0th-order lights respectively depend on the arrangements of sub-pixels included in the first to fifth virtual pixels. The first to n-th 0th-order lights are extracted respectively from the first to n-th lights, and the first to n-th 0th-order lights are converted respectively into first to fifth light sheets. The first to fifth light sheets are created at a portion to be illuminated. The arrangements of the sub-pixels included in the first to fifth pixels are controlled such that a structured light sheet or pivoting light sheet is created at the portion to be illuminated.

11 Claims, 9 Drawing Sheets

(51) Int. Cl.
*G02B 21/08* (2006.01)
*G02B 21/16* (2006.01)
*G02B 21/36* (2006.01)
*G02B 27/09* (2006.01)
*G02B 21/00* (2006.01)
*G02B 26/08* (2006.01)

(52) U.S. Cl.
CPC ............. *G02B 21/16* (2013.01); *G02B 21/36* (2013.01); *G02B 21/367* (2013.01); *G02B 26/0808* (2013.01); *G02B 27/0911* (2013.01); *G02B 27/0927* (2013.01); *G02B 27/0966* (2013.01); *G02F 1/292* (2013.01)

(58) Field of Classification Search
CPC .............. G02B 27/2214; G02B 26/005; G02B 26/0833; G02B 27/0093; G02B 27/2207; G02B 1/04; G02B 2207/115; G02B 26/001; G02B 26/0841; G02B 26/0883; G02B 27/225; G02B 6/0008; G02F 1/1335; G02F 1/133605; G02F 1/133609; G02F 2001/133601; G02F 1/29; G02F 1/01; G02F 1/095; G02F 1/13; G02F 1/133524; G02F 1/133603; G02F 1/1347; G02F 1/011; G02F 1/0115; G02F 1/0136; G02F 1/0322; G02F 1/09; G02F 1/133533

USPC ................ 359/237, 242, 265–267, 270–273, 359/290–292, 298, 315, 321, 322
See application file for complete search history.

(56) References Cited

U.S. PATENT DOCUMENTS

| | | | |
|---|---|---|---|
| 2002/0067535 A1* | 6/2002 | Trezza | G06E 3/003 359/298 |
| 2012/0140446 A1* | 6/2012 | Seetzen | G02F 1/133605 362/97.1 |
| 2013/0314631 A1* | 11/2013 | Tsvetkov | G02F 1/1333 349/33 |
| 2014/0002887 A1* | 1/2014 | Yeung | G02B 26/00 359/291 |

OTHER PUBLICATIONS

Chen et al., "Lattice light-sheet microscopy: Imaging molecules to embryos at high spatiotemporal resolution", Science (US), 2015, vol. 346, Issue 6208, pp. 1257998-1-1257998-12.

Huisken et al., "Even fluorescence excitation by multidirectional selective plane illumination microscopy (mSPIM)", Optics Letters (US), 2007, vol. 32, Issue 17, pp. 2608-2610.

* cited by examiner

Z=0μm

Z=45μm

Z=15μm

Z=50μm

Z=30μm

CONVERTER, ILLUMINATOR, AND LIGHT SHEET FLUORESCENCE MICROSCOPE

BACKGROUND OF THE INVENTION

Field of the Invention

The present invention relates to a light sheet fluorescence microscope and a technique related to the light sheet fluorescence microscope.

Description of the Background Art

In recent years, light sheet fluorescence microscopes have been widely used, and improvements have been actively made upon the light sheet fluorescence microscopes in the life science field.

In the observation of a biological sample by a light sheet fluorescence microscope, the biological sample is labeled with a fluorescent dye, the labeled biological sample is illuminated laterally by sheet-shaped illumination light, and fluorescence emitted from the illuminated portion is received. As a result, a sectioned image of the illuminated portion is achieved at high speed.

The technique of laterally illuminating a sample, however, has points to be improved.

The first point that needs improvement is that the conventional technique fails to achieve both a wide field of view (FOV) and a high Z-direction resolution. In a typical light sheet fluorescence microscope, a laser is used as a light source, and a laser beam emitted from the laser is focused into a sheet shape, creating a light sheet. Due to the effect of diffraction, the light sheet has a finite expanse through its thickness at a focus position. The resolution of the light sheet fluorescence microscope through its thickness is determined by the beam waist size of the light sheet, and thus, is improved by reducing the beam waist of the light sheet. If the beam waist of the light sheet is reduced, however, the beam size increases abruptly as away from the focus position, resulting in a smaller FOV having a uniform resolution through the thickness of the light sheet. In the light sheet fluorescence microscope, thus, the beam waist of the light sheet is normally adjusted such that the beam expands uniformly and that the Z-direction resolution accordingly becomes uniform within a desired FOV. Thus, a typical light sheet fluorescence microscope sacrifices the Z-direction resolution.

In the light sheet fluorescence microscope, an observation objective lens is arranged for observation such that the optical axis of the observation objective lens is perpendicular to the optical axis of an illumination objective lens. The depth of field (DOF) of the observation objective lens is normally smaller than the beam waist of the light sheet adjusted to have a uniform Z-direction resolution within a desired FOV. Thus, the fluorescence emitted from outside the DOF is not imaged sufficiently and forms a blurred image that does not clearly indicate sample structure information. The florescence then becomes background light and degrades the contrast of a final image finally acquired.

Further, if a highly scattering sample is observed, not only the fluorescence emitted from outside the DOF but also scattered light becomes background light, degrading the contrast of the image finally acquired. This makes it difficult to achieve a high contrast image of a highly scattering sample.

The second point that needs improvement is shadowing. The light sheet fluorescence microscope laterally illuminates a sample, and if the sample contains a portion having a high absorption, the illumination light does not reach the back of the relevant portion, forming a shadow. The illumination light does not reach the shadow, and accordingly, a fluorescence label is not excited in the shadow, so that the shadow remains as an artifact in the final image finally acquired.

To make improvements upon the first and second points that need improvement, structured illumination and pivoting illumination have been proposed and demonstrated. U.S. Pat. No. 8,970,950 (Patent Document 1); U.S. Pat. No. 9,223,125 (Patent Document 2); Keller and five others, "Fast, high-contrast imaging of animal development with scanned light sheet-based structured-illumination microscopy", *Nature Methods* (US), 2010, Vol. 7, Issue 8, pp 637-642 (Non-Patent Document 1); Chen and 25 others, "Lattice light-sheet microscopy: Imaging molecules to embryos at high spatiotemporal resolution", *Science* (US), 2015, Vol. 346, Issue 6208, pp 1257998-1-1257998-12 (Non-Patent Document 2); and Huisken et al., "Even fluorescence excitation by multidirectional selective plane illumination microscopy (mSPIM)", *Optics Letters* (US), 2007, Vol. 32, Issue 17, pp 2608-2610 (Non-Patent Document 3) are examples of such illumination.

In the light sheet fluorescence microscope with structured illumination, a sample is illuminated by three or more types of light sheets that have a sinusoidal intensity distribution but respectively have three or more types of different phases. Additionally, three or more images are individually acquired during the illumination of the sample by the three or more types of light sheets. Further, the acquired three or more images are subjected to simple image processing to remove the background light that forms a blurred image, so that a final image having a high contrast is acquired. The techniques described in Non-Patent Documents 1 and 2 are examples of such techniques.

In the light sheet fluorescence microscope with pivoting illumination, a sample is sequentially illuminated by two or more light sheets having different propagation angles. Consequently, the illumination light reaches the back of the portion having a high absorption, reducing the influence of the shadow. The techniques described in Patent Document 1 and Non-Patent Document 3 are examples of such techniques. The techniques for pivoting illumination are specific to light sheet fluorescence microscopes.

The light sheet fluorescence microscope with structured illumination typified by the techniques described in Patent Document 2 and Non-Patent Document 2 uses a liquid crystal on silicon-spatial light modulator (LCOS-SLM) to create a light sheet having a sinusoidal intensity distribution. The microscope also uses galvanometer mirrors to shift the phase of the intensity distribution. The phase shift speed of the intensity distribution is thus limited by the scanning speed of the galvanometer mirrors. On the other hand, the scanning speed of the galvanometer mirrors is several tens of kHz at most. Faster image acquisition is thus difficult in the light sheet fluorescence microscope.

In digital scanned laser light sheet fluorescence microscopy with incoherent structured illumination microscopy (DSLM-SI) described in Non-Patent Document 1, a linearly focused laser beam is scanned by a galvanometer mirror in the focal plane of the observation objective lens to create a phantom light sheet. Also, to create structured illumination, the intensity of a laser beam is subjected to faster temporal modulation by an acousto-optic modulator (AOM) in synchrony with scanning of the laser beam. The modulation speed of the AOM is normally about several MHz. The frequency of the structured illumination is limited by the size of the focused beam waist even when the modulation rate of the AOM is high. The frequency of the structured illumination is an important parameter for determining sectioning capability, and the sectioning capability is improved more as the frequency of the structured illumination is higher. For this reason, the limitation of the frequency of the structured illumination by the size of the focused beam waist tends to inhibit an improvement in sectioning capability. Additionally, the system tends to be complicated because, for example, the DSLM-SI needs to bring the modulation by the AOM into synchronization with scanning by the galvanometer mirror.

The pivoting illumination typified by the pivoting illumination described in Non-Patent Document 3 uses a galvanometer mirror to switch the propagation direction of the light sheet. The speed of switch of the propagation direction is thus limited by the scanning speed of the galvanometer mirror. On the other hand, the scanning speed of the galvanometer mirror is several tens of kHz at most. Faster image acquisition is difficult in pivoting illumination.

As described above, the conventional structured illumination and pivoting illumination have a problem of the difficulty in acquiring an image at higher speed. Additionally, the conventional structured illumination has a problem of the difficulty in increasing the frequency of the structured illumination.

SUMMARY OF THE INVENTION

The present invention has an object to provide a converter, an illuminator, and a light sheet fluorescence microscope that enable both faster image acquisition and improved image quality by structured illumination or pivoting illumination.

The present invention relates to a converter that converts a line light into a structured light sheet or pivoting light sheet.

The converter includes a spatial light modulator, an optical system, and a controller.

The spatial light modulator includes first to n-th pixels, where n is an integer greater than or equal to 2. The first to n-th pixels respectively include first to n-th groups of sub-pixels.

When a line light enters the first to n-th pixels, first to n-th lights are emitted respectively from the first to n-th pixels. The first to n-th lights can respectively include first to n-th specific-order lights. The intensities and phases of the first to n-th specific-order lights respectively depend on arrangements of the first to n-th groups of sub-pixels.

The optical system extracts the first to n-th specific-order lights respectively from the first to n-th lights, converts the first to n-th specific-order lights respectively into first to n-th light sheets, and creates the first to n-th light sheets at a portion to be illuminated.

The controller controls the arrangements of the first to n-th groups of sub-pixels such that a structured light sheet or pivoting light sheet is created at the portion to be illuminated.

The present invention is also directed to an illuminator that includes the converter and creates a structured light sheet or pivoting light sheet. The present invention is also directed to a light sheet fluorescence microscope including the illuminator.

Control of an illumination profile required in structured illumination or pivoting illumination is enabled by a high-speed spatial light modulator. Therefore, the light sheet fluorescence microscope enables both improved image quality by structured illumination or pivoting illumination and faster image acquisition.

These and other objects, features, aspects and advantages of the present invention will become more apparent from the following detailed description of the present invention when taken in conjunction with the accompanying drawings.

DESCRIPTION OF THE PREFERRED EMBODIMENTS

1. Light Sheet Fluorescence Microscope

Figure 1:
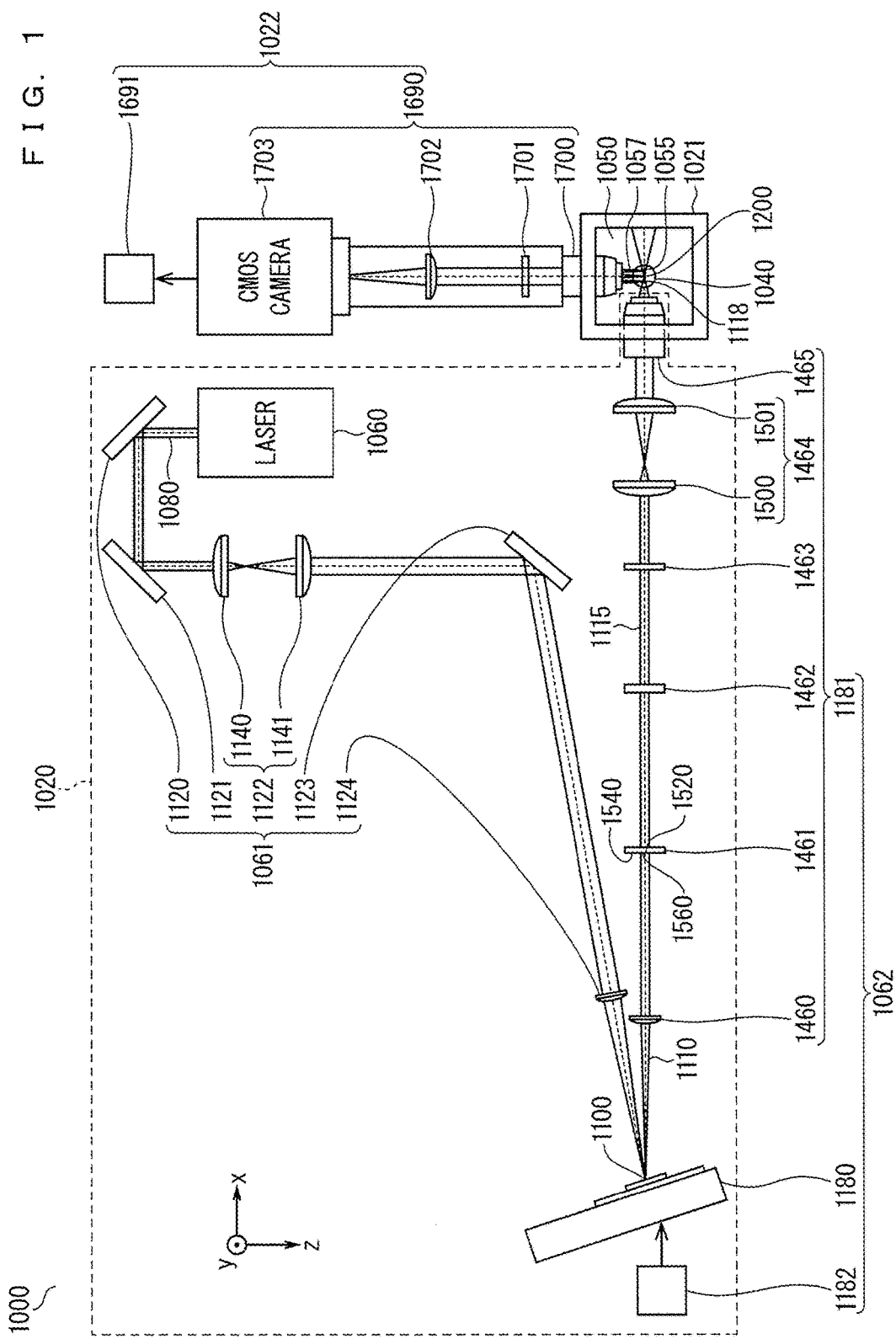
FIG. 1 is a schematic diagram illustrating a section of a light sheet fluorescence microscope of a first embodiment.

FIG. 1 is a schematic diagram illustrating a section of a light sheet fluorescence microscope of a first embodiment. FIG. 1 also illustrates coordinate axes indicating an xyz orthogonal coordinate system fixed in the light sheet fluorescence microscope of the first embodiment.

A light sheet fluorescence microscope 1000 illustrated in FIG. 1 includes an illuminator 1020, a sample chamber 1021, and an imaging device 1022. The light sheet fluorescence microscope 1000 may include components other than these components.

In the observation of a sample 1040 by the light sheet fluorescence microscope 1000, the sample 1040 is labeled by a fluorescent dye, and the labeled sample 1040 is housed in a space 1050 defined in the sample chamber 1021. The illuminator 1020 illuminates the housed sample 1040 from the x direction by a light sheet 1055 positioned parallel to the xy plane. The light sheet 1055 is a sheet-shaped illumination light and serves as an excitation light that excites the fluorescent dye. Thus, when the sample 1040 is illuminated by the light sheet 1055, the section of the sample 1040 is illuminated by the light sheet 1055, and the fluorescent dye existing on the section of the sample 1040 is excited, so that fluorescence 1057 is emitted from the fluorescent dye existing on the section of the sample 1040. Further, the imaging device 1022 captures the housed sample 1040 from the z direction and receives the emitted fluorescence 1057, imaging the section of the sample 1040.

The light sheet 1055 is a structured light sheet or pivoting light sheet. In the structured light sheet, the intensity of the structured light sheet changes depending on the position of the structured light sheet in its expansion direction. In the pivoting light sheet, the propagation direction of the pivoting light sheet changes with time.

2. Illuminator

The illuminator 1020 includes a laser 1060, an anamorphic optical system 1061, and a converter 1062 as illustrated in FIG. 1. The illuminator 1020 may include components other than these components.

The laser 1060 emits a laser beam 1080. The anamorphic optical system 1061 converts the laser beam 1080 into a line light 1100. The converter 1062 converts the line light 1100 into the light sheet 1055. As a result, the illuminator 1020 creates the light sheet 1055 that is a structured light sheet or pivoting light sheet and performs structured illumination or pivoting illumination by the structured light sheet or pivoting light sheet.

3. Laser

The laser 1060 is a diode pumped solid state laser, and the laser beam 1080 is a coherent light having a wavelength of 473 nm. The laser 1060, which is a diode pumped solid state laser that emits a coherent light having a wavelength of 473 nm, may be replaced by any other type of light source that emits a coherent light.

4. Anamorphic Optical System

The anamorphic optical system 1061 includes a mirror 1120, a mirror 1121, a telescope 1122, a mirror 1123, and a cylindrical lens 1124 as illustrated in FIG. 1. The telescope 1122 includes spherical lenses 1140 and 1141. The anamorphic optical system 1061 may include components other than these components.

The laser beam 1080 emitted by the laser 1060 is reflected by the mirror 1120, is further reflected by the mirror 1121 after being reflected by the mirror 1120, passes through the telescope 1122 after being reflected by the mirror 1121, is reflected by the mirror 1123 after passing through the telescope 1122, and passes through the cylindrical lens 1124 after being reflected by the mirror 1123.

The telescope 1122 is also referred to as a beam expander. The laser beam 1080 is expanded by the telescope when the laser beam 1080 passes through the telescope 1122. The diameter of the laser beam 1080 after being expanded by the telescope 1122 is larger than the diameter of the laser beam 1080 before being expanded by the telescope 1122. For example, if the telescope 1122 has a 2× magnification and the diameter of the laser beam 1080 before being expanded by the telescope 1122 is 2 mm, the diameter of the laser beam 108 after being expanded by the telescope 1122 is 4 mm.

The cylindrical lens 1124 focuses the laser beam 1080 in line, creates a line light 1100 with a line-like shape, and converts the laser beam 1080 into the line light 1100 as the laser beam 1080 passes through the cylindrical lens 1124.

The mirror 1120, mirror 1121, telescope 1122, and mirror 1123 may be omitted.

5. Converter

Figure 2:
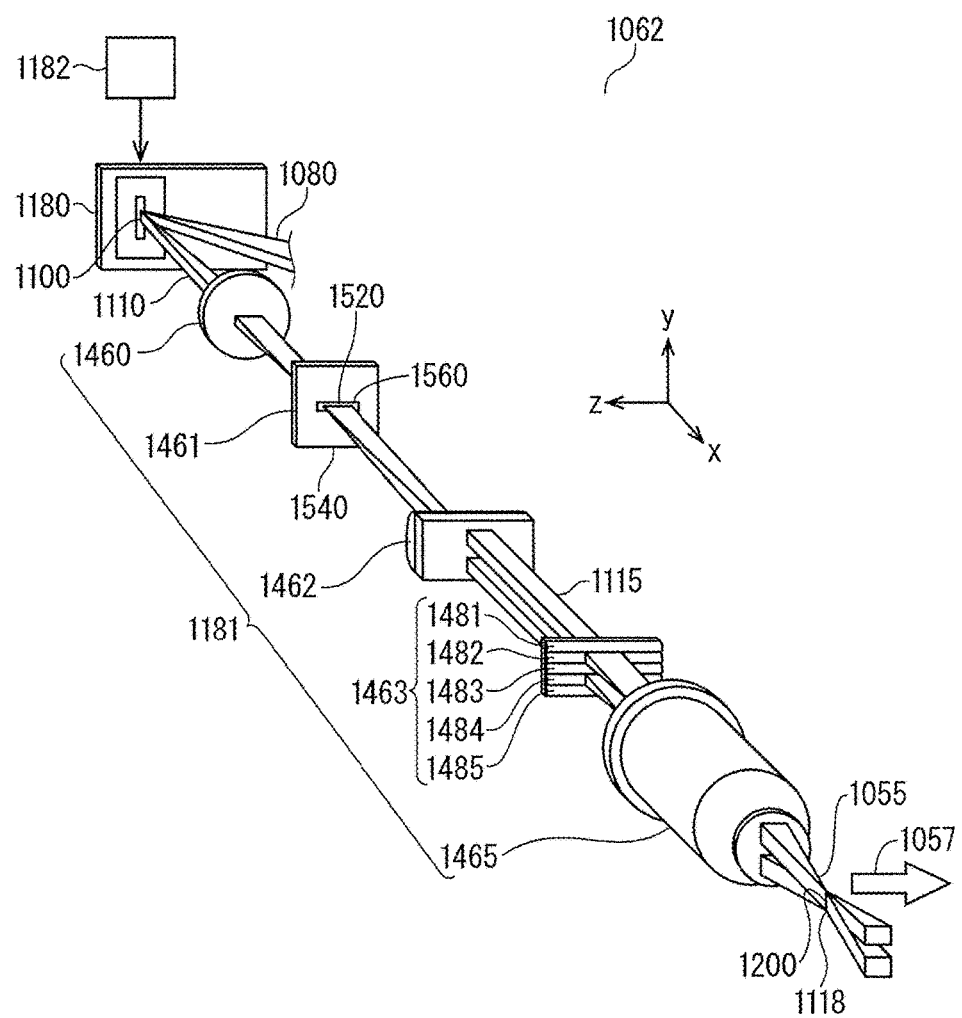
FIG. 2 is a perspective view illustrating a converter included in the light sheet fluorescence microscope of the first embodiment.
Figure 3:
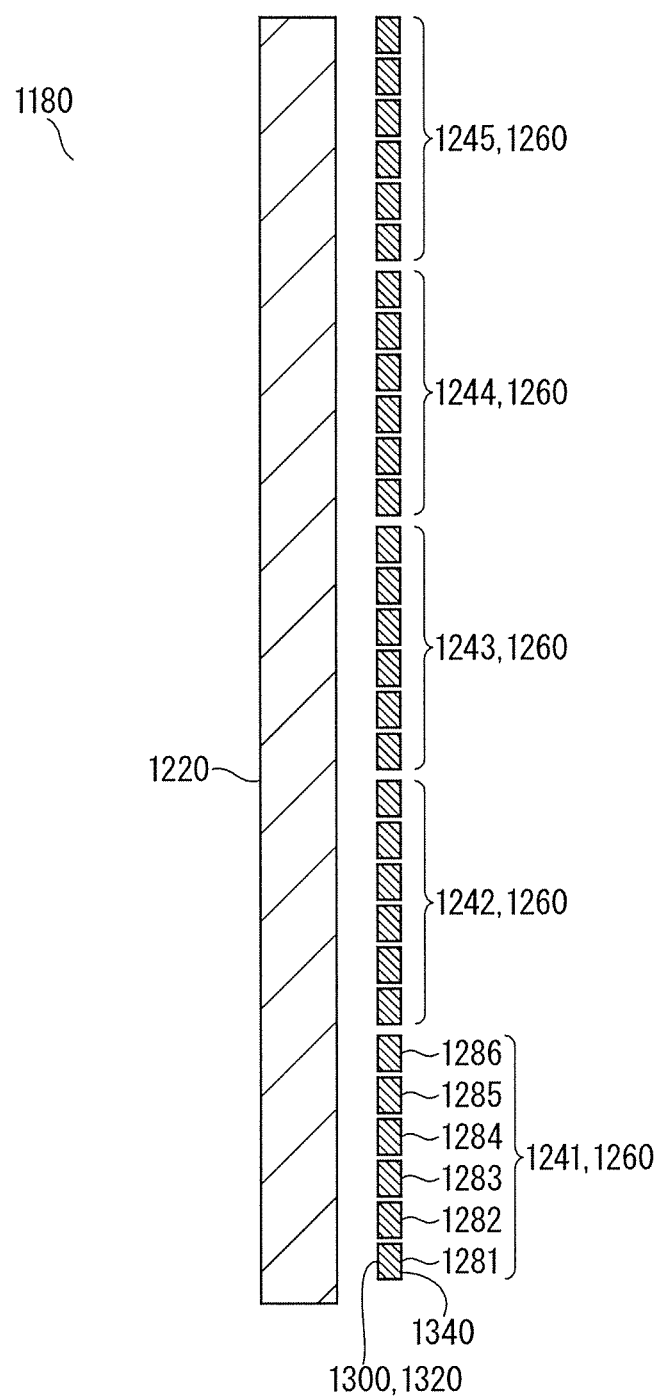
FIG. 3 is a schematic diagram illustrating a section of a grating light valve (GLV) included in the light sheet fluorescence microscope of the first embodiment.

FIG. 2 is a perspective view illustrating a converter included in the light sheet fluorescence microscope of the first embodiment. FIG. 2 also illustrates the coordinate axes indicating the xyz orthogonal coordinate system fixed in the light sheet fluorescence microscope of the first embodiment. FIG. 3 is a schematic diagram illustrating a section of a grating light valve (GLV. RTM) included in the light sheet fluorescence microscope of the first embodiment The converter 1062 includes a GLV 1180, an optical system 1181, and a controller 1182 as illustrated in FIGS. 1 and 2. The converter 1062 may include components other than these components.

In the conversion of the line light 1100 into the light sheet 1055 by the converter 1062, when the line light 1100 with a line-like shape is generated on the GLV 1180, the GLV 1180 emits the light 1110 including a 0th-order light 1115. The optical system 1181 extracts the 0th-order light 1115 from the emitted light 1110 and converts the extracted 0th-order light 1115 into a light sheet 1118, creating the light sheet 1118 at a portion 1200 to be illuminated. Further, the controller 1182 performs processing of controlling the GIN 1180 such that the light sheet 1055, which is a structured light sheet or pivoting light sheet, is created at the portion 1200 to be illuminated. In place of the GLV 1180 emitting the light 1110 including the 0th-order light 1115 and the optical system 1181 extracting the 0th-order light 1115 and converting the 0th-order light 1115 into the light sheet 1118, the following is also allowed: the GLV 1180 emits the light including a specific-order light other than the 0th-order light, and the optical system 1181 extracts the specific-order light and converts the specific-order light into a light sheet. For example, the GLV 1180 is allowed to emit the light including two kinds of first-order diffracted lights respectively travel in two directions which differ from each other, and the optical system 1181 is allowed to extract either of the two kinds of the first-order diffracted lights and convert either of two kinds of the first-order diffracted light into a light sheet.

6. GLV

The GLV 1180 is a phase-type spatial light modulator and, as illustrated in FIG. 3, includes a substrate 1220 and includes virtual pixels 1241, 1242, 1243, 1244, and 1245. Each virtual pixel 1260 that is each of the virtual pixels 1241, 1242, 1243, 1244, and 1245 includes sub-pixels 1281, 1282, 1283, 1284, 1285, and 1286. The GLV 1180 may include components other than these components. The five virtual pixels 1241, 1242, 1243, 1244, and 1245 may be replaced by two or more and four or less, or six or more virtual pixels. A group of sub-pixels consisting of the six sub-pixels 1281, 1282, 1283, 1284, 1285, and 1286 may be replaced by a group of sub-pixels consisting of two or more and five or less, or seven or more sub-pixels.

The virtual pixels 1241, 1242, 1243, 1244, and 1245 are arranged along the direction along which the line light 1100 extends. The sub-pixels 1281, 1282, 1283, 1284, 1285, and 1286 are arranged along the direction along which the line light 1100 extends. As a result, the line light 1100 enters the each virtual pixel 1260, and the line light 1100 enters each sub-pixel 1300 which is each of the sub-pixels 1281, 1282, 1283, 1284, 1285, and 1286 included in each virtual pixel 1260.

When the line light 1100 enters each virtual pixel 1260, each virtual pixel 1260 reflects or diffracts this incoming line light 1100, and the light is emitted from the virtual pixels 1260. The intensity and phase of the 0th-order light and the intensity and phase of the first-order diffracted light that are included in the light emitted from each virtual pixel 1260 depend on the arrangement of each sub-pixel 1300 included in each virtual pixel 1260.

Each sub-pixel 1300 includes a ribbon 1320. A reflection surface 1340 of the ribbon 1320 reflects the line light 1100. The ribbon 1320, which is a minute beam, is displaced in the direction perpendicular to the reflection surface 1340 according to the potential difference applied between the ribbon 1320 and the substrate 1220 and changes the phase of the light reflected by the reflection surface 1340 according to the magnitude of the displacement. The ribbon 1320 thus changes the phase of the light reflected by the reflection surface 1340 according to the potential difference applied between the ribbon 1320 and the substrate 1220. The intensity and phase of the 0th-order light and the intensity and phase of the first-order diffracted light, which are included in the light emitted from the virtual pixel 1260 depend on the arrangements of six ribbons 1320 included in each virtual pixel 1260.

7. Arrangements of Sub-Pixels

Figure 4:
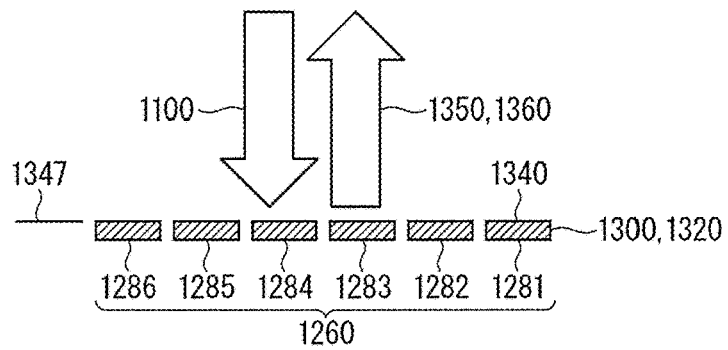
FIG. 4 is a schematic diagram illustrating arrangements of sub-pixels included in the light sheet fluorescence microscope of the first embodiment in a section when no modulation is performed.
Figure 5:
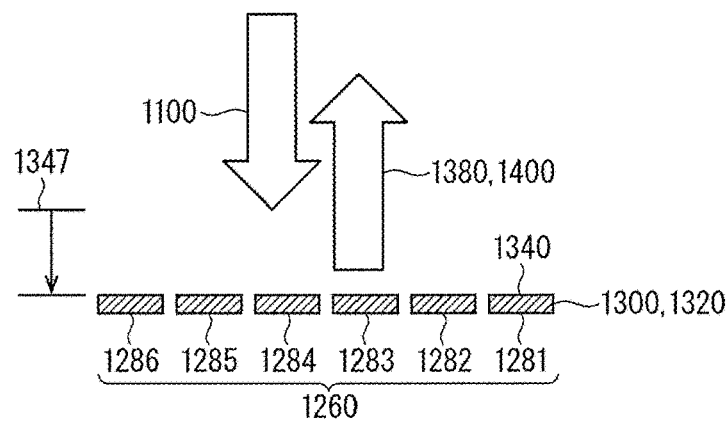
FIG. 5 is a schematic diagram illustrating arrangements of sub-pixels included in the light sheet fluorescence microscope of the first embodiment in a section when phase modulation is performed.
Figure 6:
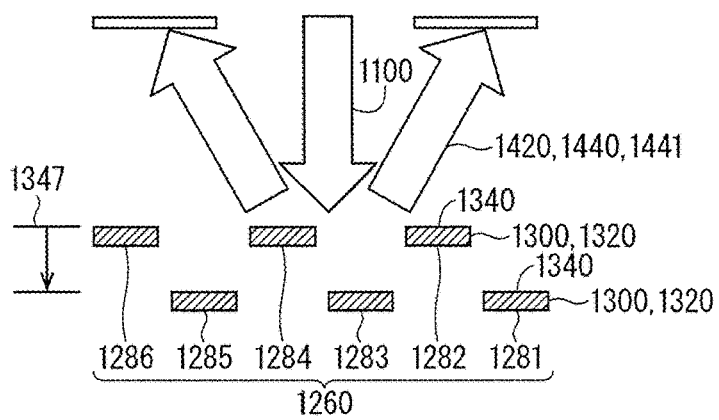
FIG. 6 is a schematic diagram illustrating arrangements of sub-pixels included in the light sheet fluorescence microscope of the first embodiment in a section when amplitude modulation is performed.

FIG. 4 is a schematic diagram illustrating arrangements of sub-pixels included in the light sheet fluorescence microscope of the first embodiment in a section when no modulation is performed. FIG. 5 is a schematic diagram illustrating arrangements of sub-pixels included in the light sheet fluorescence microscope of the first embodiment in a section when phase modulation is performed. FIG. 6 is a schematic diagram illustrating arrangements of sub-pixels included in the light sheet fluorescence microscope of the first embodiment in a section when amplitude modulation is performed.

With the arrangement when no modulation is performed which is illustrated in FIG. 4, each sub-pixel 1300 included in each virtual pixel 1260 is positioned at a position 1347 when no modulation is performed, and the reflection surfaces 1340 of the sub-pixels 1281, 1282, 1283, 1284, 1285, and 1286 are flush with one another. In this case, the sub-pixels 1281, 1282, 1283, 1284, 1285, and 1286 do not form a diffraction grating, and a light 1350 emitted from each virtual pixel 1260 when the line light 1100 enters each virtual pixel 1260 includes a 0th-order light 1360 but includes no first-order diffracted light.

With the arrangements when phase modulation is performed which is illustrated in FIG. 5, though each sub-pixel 1300 included in each virtual pixel 1260 is displaced from the position 1347 when no modulation is performed, the reflection surfaces 1340 of the sub-pixels 1281, 1282, 1283, 1284, 1285, and 1286 are flush with one another. Also in this case, the sub-pixels 1281, 1282, 1283, 1284, 1285, and 1286 do not form a diffraction grating, and a light 1380 emitted from each virtual pixel 1260 when the line light 1100 enters each virtual pixel 1260 includes a 0th-order light 1400 but includes no first-order diffracted light. The phase of the 0th-order light 1400 changes depending on the displacement of each sub pixel 1300 from the position 1347 when no modulation is performed.

With the arrangements when amplitude modulation is performed which is illustrated in FIG. 6, sub-pixels 1282, 1284, and 1286 included in each virtual pixel 1260 are positioned at the position 1347 when no modulation is performed, and the reflection surfaces 1340 of the sub-pixels 1282, 1284, and 1286 are flush with one another; the sub-pixels 1281, 1283, and 1285 included in each virtual pixel 1260 are displaced from the position 1347 when no modulation is performed, and the reflection surfaces 1340 of the sub-pixels 1281, 1283, and 1285 are flush with one another remote from the reflection surfaces 1340 of the sub-pixels 1282, 1284, and 1286 flush with one another. The reflection surfaces 1340 of the sub-pixels 1281, 1282, 1283, 1284, 1285, and 1286 thus create periodic roughness. In this case, the sub-pixels 1281, 1282, 1283, 1284, 1285, and 1286 form a diffraction grating. As the displacements of the sub-pixels 1281, 1283, and 1285 from the position 1347 when no modulation is performed become closer to a quarter of a wavelength of the line light 1100, the intensity of the 0th-order light 1440 included in a light 1420 emitted from each virtual pixel 1260 becomes smaller, and the intensity of the first-order diffracted light 1441 included in a light 1420 emitted from each virtual pixel 1260 becomes greater.

For minute adjustment of the intensity of the 0th-order light with the arrangements when amplitude modulation or phase modulation is performed, a diffraction grating may be formed in which the sub-pixels 1281, 1282, 1283, 1284, 1285, and 1286 included in each virtual pixel 1260 have an extremely small phase depth.

8. Optical System

The optical system 1181 includes a spherical lens 1460, a slit plate 1461, a cylindrical lens 1462, a lenticular lens 1463, a telescope 1464, and an illumination objective lens 1465 as illustrated in FIGS. 1 and 2. The lenticular lens 1463 includes lenticular lens elements 1481, 1482, 1483, 1484, and 1485. The telescope 1464 includes spherical lenses 1500 and 1501.

The virtual pixels 1241, 1242, 1243, 1244, and 1245 respectively emit first to fifth lights. First to fifth 0th-order lights respectively included in the emitted first to fifth lights travel in the x direction that is a common direction. The first to fifth lights pass through the spherical lens 1460 and then enter the slit plate 1461. Only the first to fifth 0th-order lights respectively included in the first to fifth lights are emitted from the slit plate 1461. The first to fifth 0th-order lights pass through the cylindrical lens 1462, pass through the lenticular lens 1463 after passing through the cylindrical lens 1462, pass through the telescope 1464 after passing through the lenticular lens 1463, and pass through the illumination objective lens 1465 after passing through the telescope 1464.

The positions of the light paths of the first to fifth lights are identical to one another in the z direction but differ from one another in the y direction. Similarly, the positions of the light paths of the first to fifth 0th-order lights are identical to one another in the z direction but differ from one another in the y direction.

The GLV 1180 is arranged on the front focal plane of the spherical lens 1460. The slit plate 1461 is arranged on the rear focal plane of the spherical lens 1460. The spherical lens 1460 is a Fourier transform lens and performs Fourier transform on the first to fifth lights. The spherical lens 1460 thus guides the first to fifth 0th-order lights to a common position 1520 located on the rear focal plane of the spherical lens 1460 and at which a slit 1560 is arranged, and guides first to fifth high-order diffracted lights respectively included in the first to fifth lights to a position different from the common position 1520.

The slit plate 1461 includes a shield 1540. The slit plate 1461 has a slit 1560. The slit 1560 is surrounded by the shield 1540. The slit 1560 is arranged at the common position 1520 to which the first to fifth 0th-order lights are guided. The first to fifth 0th-order lights thus pass through the spherical lens 1460 and then pass through the slit 1560, and the first to fifth high-order diffracted lights pass through the spherical lens 1460 and are then shielded by the shield 1540. Thus, the slit plate 1461 is a spatial filter that extracts the first to fifth 0th-order lights guided to the common position 1520 and removes the first to fifth high-order diffracted lights not guided to the common position 1520, and the slit 1560 is a pass-through portion that selectively causes the first to fifth 0th-order lights guided to the common position 1520 to pass therethrough. The slit plate 1461 that is a plate-shaped spatial filter may be replaced by a spatial filter that is not shaped into a plate. In the extraction of the first to fifth first-order diffracted lights respectively included in the first to fifth lights, the slit 1560 is arranged at the common position to which the first to fifth first-order diffracted lights are guided.

The respective intensities of the first to fifth 0th-order lights become smaller as the displacements of the sub-pixels 1281, 1283 and 1285 from the portion 1347 when no modulation is performed become closer to a quarter of a wavelength of the line light 1100 in the virtual pixels 1241, 1242, 1243, 1244 and 1245. As a result, the extraction of the first to fifth 0th-order lights respectively from the first to fifth lights achieves the light subjected to amplitude modulation by the GLV 1180.

The spherical lens 1460 and the slit plate 1461 extract the first to fifth 0th-order lights respectively from the first to fifth lights and remove the first to fifth high-order diffracted lights respectively from the first to fifth lights.

The slit plate 1461 is arranged on the front focal plane of the cylindrical lens 1462. The plane of incidence of the lenticular lens 1463 is arranged on the rear focal plane of the cylindrical lens 1462. The cylindrical lens 1462 is an inverse Fourier transform lens for the y direction and performs inverse Fourier transform on the first to fifth 0th-order lights. The cylindrical lens 1462 thus causes the first to fifth 0th-order lights to pass therethrough and causes the first to fifth 0th-order lights to travel in the x direction that is a common direction after the first to fifth 0th-order lights pass through the slit 1560.

The cylindrical lens 1462 allows the first to fifth 0th-order lights to travel again in the x direction that is a common direction.

The lenticular lens elements 1481, 1482, 1483, 1484, and 1485 respectively correspond to the virtual pixels 1241, 1242, 1243, 1244, and 1245 and respectively correspond to the first to fifth lights. The first to fifth 0th-order lights respectively pass through the lenticular lens elements 1481, 1482, 1483, 1484, and 1485 as passing through the lenticular lens 1463. The virtual pixels 1241, 1242, 1243, 1244, and 1245 are arranged so as to prevent each of the first to fifth 0th-order lights from spreading across two adjacent lenticular lens elements.

Each of the lenticular lens elements 1481, 1482, 1483, 1484, and 1485 is a cylindrical lens. The lenticular lens elements 1481, 1482, 1483, 1484, and 1485 are ordered in the y direction, focus the first to fifth 0th-order lights in the y direction, and focus these lights in line.

The lenticular lens 1463 formed of the five cylindrical lenses 1481, 1482, 1483, 1484, and 1485 coupled to one another may be replaced by five cylindrical lenses not coupled to one another.

The plane of incidence of the lenticular lens 1463 and the GLV 1180 have such a relationship as to form an image for the y direction. Each of the first to fifth 0th-order lights is therefore a parallel light for the z direction.

The telescope 1464 is also referred to as a beam expander and expands each of the first to fifth 0th-order lights. The telescope 1464 may be omitted.

The illumination objective lens 1465 guides the first to fifth 0th-order lights to the portion 1200 to be illuminated located on the rear focal plane of the illumination objective lens 1465. The illumination objective lens 1465 is configured and arranged so as to focus the first to fifth 0th-order lights on the portion 1200 to be illuminated.

The lenticular lens 1463 and the illumination objective lens 1465 convert the first to fifth 0th-order lights respectively into the first to fifth light sheets, so that the first to fifth light sheets are created at the portion 1200 to be illuminated.

9. Control for Amplitude Modulation and Phase Modulation

In the control of the GLV 1180 by the controller 1182, when causing the 0th-order light to be emitted from each virtual pixel 1260, the controller 1182 controls the arrangement of each sub-pixel 1300 such that the sub-pixels 1281, 1282, 1283, 1284, 1285, and 1286 included in each virtual pixel 1260 do not form a diffraction grating. In the control of the GLV 1180 by the controller 1182, when causing the 0th-order light not to be emitted from each virtual pixel 1260, the controller 1182 controls the arrangement of each sub-pixel 1300 such that the sub-pixels 1281, 1282, 1283, 1284, 1285, and 1286 included in each virtual pixel 1260 form a diffraction grating.

In the control of the GLV 1180 by the controller 1182, when causing the first-order diffracted light to be emitted from each virtual pixel 1260, the controller 1182 controls the arrangement of each sub-pixel 1300 such that the sub-pixels 1281, 1282, 1283, 1284, 1285, and 1286 included in each virtual pixel 1260 form a diffraction grating. In the control of the GLV 1180 by the controller 1182, when causing the first-order diffracted light not to be emitted from each virtual pixel 1260, the controller 1182 controls the arrangement of each sub-pixel 1300 such that the sub-pixels 1281, 1282, 1283, 1284, 1285, and 1286 included in each virtual pixel 1260 do not form a diffraction grating.

In the control of the GLV 1180 by the controller 1182, when changing the phase of the 0th-order light emitted from each virtual pixel 1260, the controller 1182 controls the arrangement of each sub-pixel 1300 included in each virtual pixel 1260 such that the position of each sub-pixel 1300 changes in the direction perpendicular to the reflection surface 1340 of each sub-pixel 1300.

10. Control for Structured Illumination

Figure 7:
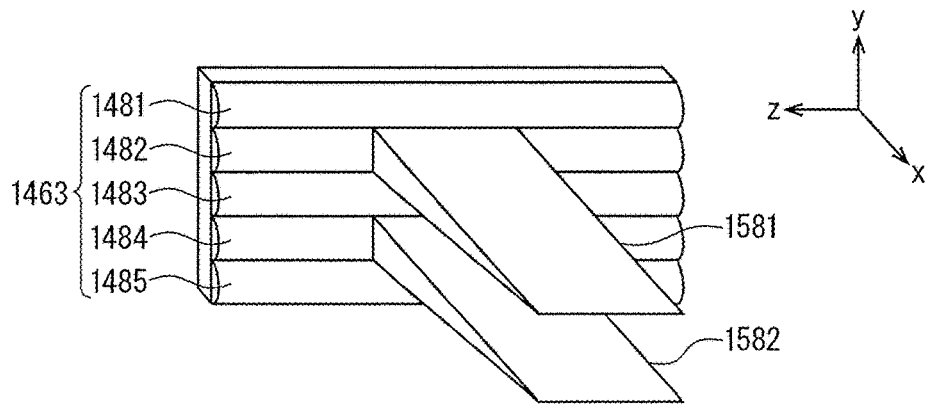
FIG. 7 is a perspective view illustrating a light path of a 0th-order light when structured illumination is performed in the light sheet fluorescence microscope of the first embodiment.
Figure 8:
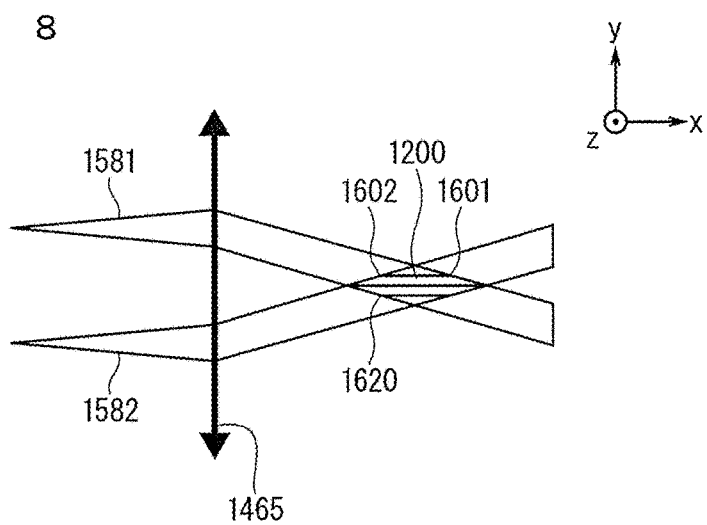
FIG. 8 is a schematic diagram illustrating a light path of a 0th-order light in a section when structured illumination is performed in the light sheet fluorescence microscope of the first embodiment.

FIG. 7 is a perspective view illustrating a light path of a 0th-order light when structured illumination is performed in the light sheet fluorescence microscope of the first embodiment. FIG. 8 is a schematic diagram illustrating a light path of a 0th-order light in a section when structured illumination is performed in the light sheet fluorescence microscope of the first embodiment. The light path illustrated in FIG. 2 is also a light path when structured illumination is performed in the light sheet fluorescence microscope of the first embodiment.

When structured illumination is performed, in the control of the GLV 1180 by the controller 1182, the arrangement of each sub-pixel 1300 included in the virtual pixels 1242 and 1244 is controlled such that the second 0th-order light 1581 and the fourth 0th-order light 1582 are emitted at a time respectively from two virtual pixels 1242 and 1244 included in the virtual pixels 1241, 1242, 1243, 1244, and 1245, as illustrated in FIGS. 7 and 8.

The arrangement of each sub-pixel 1300 included in the virtual pixels 1241, 1243, and 1245 is controlled such that the first 0th-order light, third 0th-order light, and fifth 0th-order light are not emitted respectively from three virtual pixels 1241, 1243, and 1245 while the 0th-order lights 1581 and 1582 are emitted respectively from the virtual pixels 1242 and 1244.

As a result, two light sheets 1601 and 1602 are created at the portion 1200 to be illuminated. The propagation directions of the light sheets 1601 and 1602 differ from each other. The light sheets 1601 and 1602 interfere with each other, so that an interference pattern is formed. Since the interference pattern provides a change in the brightness according to the position in the direction in which the light sheets 1601 and 1602 expand, and when the interference pattern is formed, a structured light sheet 1620 is created at the portion 1200 to be illuminated.

Any other control may replace the control of causing the second 0th-order light 1581 and the fourth 0th-order light 1582 to be emitted respectively from the virtual pixels 1242 and 1244, and causing the first 0th-order light, the third 0th-order light, and the fifth 0th-order light not to be emitted respectively from the virtual pixels 1241, 1243, and 1245. The other control performs control of causing $i_1$-th and $i_2$-th 0th-order lights to be emitted respectively from $i_1$-th and $i_2$-th virtual pixels that are any two virtual pixels included in the first to fifth virtual pixels 1241, 1242, 1243, 1244, and 1245, and causing $i_3$-th, $i_4$-th, and $i_5$-th 0th-order lights not to be emitted respectively from remaining $i_3$-th, $i_4$-th, and $i_5$-th virtual pixels. The combination of integers $i_1$ and $i_2$ differs from the combination of integers 2 and 4. The $i_1$-th and $i_2$-th virtual pixels are switched in a cyclical fashion such that a structured light sheet that is also a pivoting light sheet is created at the portion 1200 to be illuminated as described in "11. Control for Pivoting Illumination", which will be described below.

When five virtual pixels 1241, 1242, 1243, 1244, and 1245 are replaced by two virtual pixels, there is no virtual pixel that outputs no 0th-order light during structured illumination.

When structured illumination is performed, the arrangement of each sub-pixel 1300 included in the virtual pixels 1242 and 1244 is controlled such that a phase difference between the 0th-order lights 1581 and 1582 changes while the 0th-order lights 1581 and 1582 are emitted respectively from the virtual pixels 1242 and 1244 in the control of the GLV 1180 by the controller 1182. This changes the phase of the intensity distribution of the structured light sheet 1620.

The phase difference between the 0th-order lights 1581 and 1582 may be changed by changing the phase of one of the 0th-order lights 1581 and 1582 or by changing phases of both the 0th-order lights 1581 and 1582.

The frequency of the intensity distribution of the structured light sheet 1620 is adjusted according to the spacing between the lenticular lens elements 1482 and 1484 that respectively cause the 0th-order lights 1581 and 1582 to pass therethrough.

In the adoption of the simplifying assumption that each of the light sheets 1601 and 1602 extends infinitely in the z direction, the intensity distribution of the structured light sheet 1620 is expressed by Equation (1):

$$|A\exp(ik_1 \cdot r) + A\exp\{i(k_2 \cdot r + \phi)\}|^2 = 2A^2\{1 + \cos(2k \sin\theta - \phi)\} \quad (1)$$

where A denotes the amplitudes of the light sheets 1601 and 1602, $k_1$ and $k_2$ represent wave vectors existing on the plane with an angle $\theta$ formed with each of the light sheets 1601 and 1602, the angle $\theta$ is a half of an angle $2\theta$ formed between the light sheet 1601 and the light sheet 1602, $k_1$ and $k_2$ are expressed respectively by $k_1 = (k \cos\theta, k \sin\theta, 0)$ and $k_2 = (k \cos\theta, -k \sin\theta, 0)$, and $\phi$ denotes a phase difference between the light sheet 1601 and the light sheet 1602.

Equation (1) shows that the phase of the intensity distribution of the structured light sheet 1620 is controlled by a phase difference between the light sheet 1601 and the light sheet 1602.

11. Control for Pivoting Illumination

Figure 9:
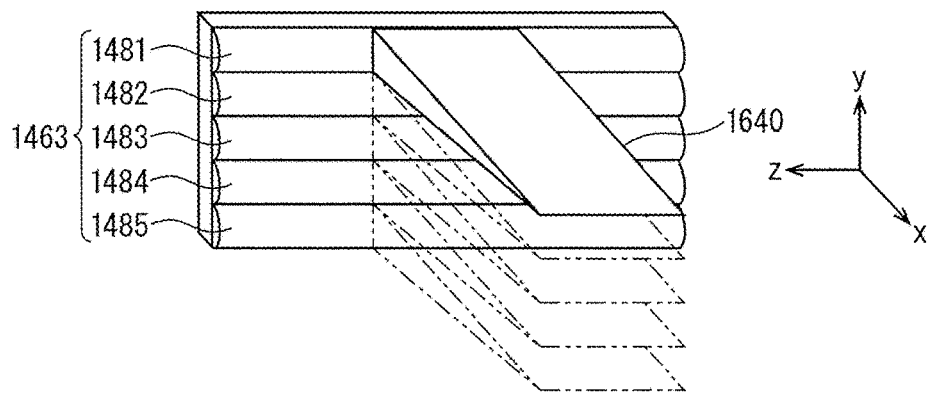
FIG. 9 is a perspective view illustrating a light path of a 0th-order light when pivoting illumination is performed in the light sheet fluorescence microscope of the first embodiment.
Figure 10:
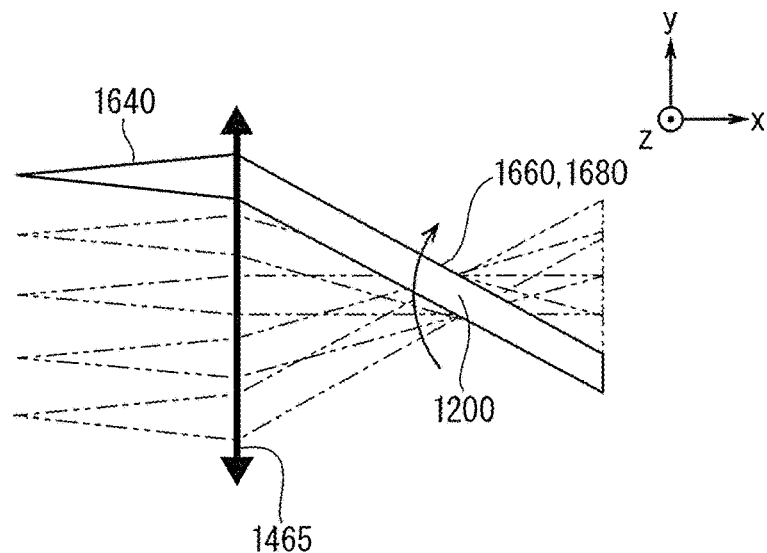
FIG. 10 is a schematic diagram illustrating a light path of a 0th-order light in a section when pivoting illumination is performed in the light sheet fluorescence microscope of the first embodiment.

FIG. 9 is a perspective view illustrating a light path of a 0th-order light when pivoting illumination is performed in the light sheet fluorescence microscope of the first embodiment. FIG. 10 is a schematic diagram illustrating a light path of a 0th-order light in a section when pivoting illumination is performed in the light sheet fluorescence microscope of the first embodiment.

When pivoting illumination is performed, in control of the GLV 1180 by the controller 1182, the arrangement of each sub-pixel 1300 included in a $j_1$-th virtual pixel, which is one virtual pixel included in the first to fifth virtual pixels 1241, 1242, 1243, 1244, and 1245, are controlled such that a $j_1$-th 0th-order light 1640 is emitted from the $j_1$-th virtual pixel, as illustrated in FIGS. 9 and 10.

The arrangement of each sub-pixel 1300 included in a $j_2$-th virtual pixel, which is each of remaining four virtual pixels is controlled such that a $j_2$-th 0th-order light is not emitted from the $j_2$-th virtual pixel while the 0th-order light 1640 is emitted from the $j_1$-th virtual pixel.

Further, the arrangement of each sub-pixel 1300 included in the virtual pixels 1241, 1242, 1243, 1244, and 1245 is controlled such that the $j_1$-th virtual pixel is switched in a cyclical fashion.

As a result, one light sheet 1660 is created at the portion 1200 to be illuminated, but the propagation direction of the created one light sheet 1660 changes with time. A pivoting light sheet 1680 is thus created at the portion 1200 to be illuminated.

12. Sample Chamber

In the sample chamber 1021 illustrated in FIG. 1, the sample 1040 is held by transparant agarose gel. The sample 1040 is thus arranged in front of the illumination objective lens 1465 and a detection objective lens 1700 which will be described below. The surrounding of the agarose gel is filled with water. The refractive index of the agarose gel and the refractive index of the water are caused to match each other. The condition that the reflective indices are caused to match one another in the section from the illumination objective lens 1465 and the detection objective lens 1700 to the sample 1040 is realized.

The illumination objective lens 1465 and the detection objective lens 1700 are inserted into the sample chamber 1021 to reach the space 1050. The illumination objective lens 1465 and the detection objective lens 1700 are accordingly water immersion lenses that are immersed in water.

13. Imaging Device

The imaging device 1022 includes a main body 1690 and an image processing unit 1691 as illustrated in FIG. 1. The main body 1690 includes a detection objective lens 1700, a long-wavelength pass filter 1701, a tube lens 1702, and a CMOS camera 1703. A CMOS camera 1703 may be replace by a camera that is other than the CMOS camera.

The fluorescence 1057 emitted from the fluorescent dye existing on the section of the sample 1040 passes through the detection objective lens 1700, passes through the long-wavelength pass filter 1701 after passing through the detection objective lens 1700, passes through the tube lens 1702 after passing through the long-wavelength pass filter 1701, and is received by the CMOS camera 1703 after passing through the tube lens 1702. As a result, the fluorescence 1057 is focused on the CMOS camera 1703.

The CMOS camera 1703 captures an image formed by the focused fluorescence 1057.

The main body 1690 thus images the section of the sample 1040 to acquire an image that is a sectioned image of the sample 1040.

The image processing unit 1691 processes the acquired image as required.

14. Imaging when Structured Illumination is Performed

When structured illumination is performed, the controller 1182 controls the arrangement of each sub-pixel 1300 included in each virtual pixel 1260 such that first, second, and third structured light sheets 1620 respectively having phase differences $\phi$ of 0, $2/3\pi$, and $4/3\pi$ are created.

The main body 1690 images the section of the sample 1040 such that raw image $I_1$, $I_2$, and $I_3$ that are sectioned images of the sample 1040 are acquired respectively while the sample 1040 is illuminated by the created first, second, and third structured light sheets 1620.

Further, the image processing unit 1691 combines the acquired raw images $I_1$, $I_2$, and $I_3$ according to Equation (2) to create a reconstructed image $I_{SI}$.

$$I_{SI} = \sqrt{(I_1-I_2)^2+(I_2-I_3)^2+(I_3-I_1)^2} \quad (2)$$

The combination of three phases, 0, $2/3\pi$, and $4/3\pi$, may be replaced by the combination of other three phases. The combination of three phases may be replaced by the combination of four or more phases.

Quantitatively, the detection objective response to a thin, patterned, defocused fluorescent sheet is given by Equation (3):

$$I(u) \approx f(v)\left\{2\frac{J_1\left[uv\left(1-\frac{v}{2}\right)\right]}{\left[uv\left(1-\frac{v}{2}\right)\right]}\right\} \quad (3)$$

where $f(v)$ is expressed by $f(v)=1-0.69v+0.0076v^2+0.043v^3$, and $J_1$ is the first Bessel function of the first kind. Normalized axial defocus u is expressed by $u=(8\pi/\lambda)z\sin^2(\alpha/2)$, normalized frequency v is expressed by $v=2\sin\theta/\sin\alpha$, where $\lambda$ is the emission wavelength, z is the real defocus coordinate, and $\alpha$ is the collection half angle of the detection objective.

The thinnest sections are obtained by selecting v such that the full width at half maximum is minimized, that is, $I(u)=0.5$ at the smallest possible u. This condition is met when $v=1$, which balances thicker sectioning (lower v) and the attenuation of the frequency of the structured illumination (higher v).

15. Imaging when Pivoting Illumination is Performed

When pivoting illumination is performed, the controller 1182 controls the arrangement of each sub-pixel 1300 included in each virtual pixel 1260 such that the pivoting light sheet 1680 formed of five light sheets that have different propagation directions and are created in a cyclical fashion is created.

The main body 1690 images the section of the sample 1040 so as to acquire the sectioned image of the sample 1040 while the pivoting light sheet 1680 illuminates the sample 1040. Imaging is performed such that all the five light sheets illuminate the sample 1040 during one imaging. As a result, the five sectioned images of the sample 1040, which are respectively obtained by illuminating the section of the sample 1040 by the five light sheets, are averaged. Such imaging is enabled by high-speed running of the GLV 1180 that controls switching of the propagation direction of the light sheet.

16. Advantages of Light Sheet Fluorescence Microscope of First Embodiment

With the light sheet fluorescence microscope 1000 of the first embodiment, control of the phase of the light sheet, which is performed in structured illumination, and control of switching of the propagation direction of the light sheet, which is performed in pivoting illumination, are enabled by the GLV 1180 capable of running at higher speed, even about 300 kHz. The light sheet fluorescence microscope 1000 accordingly enables both improved image quality by structured illumination or pivoting illumination and faster image acquisition.

17. Demonstrations of Contrast Ratio and Phase Shift to be Achieved

Figure 11:
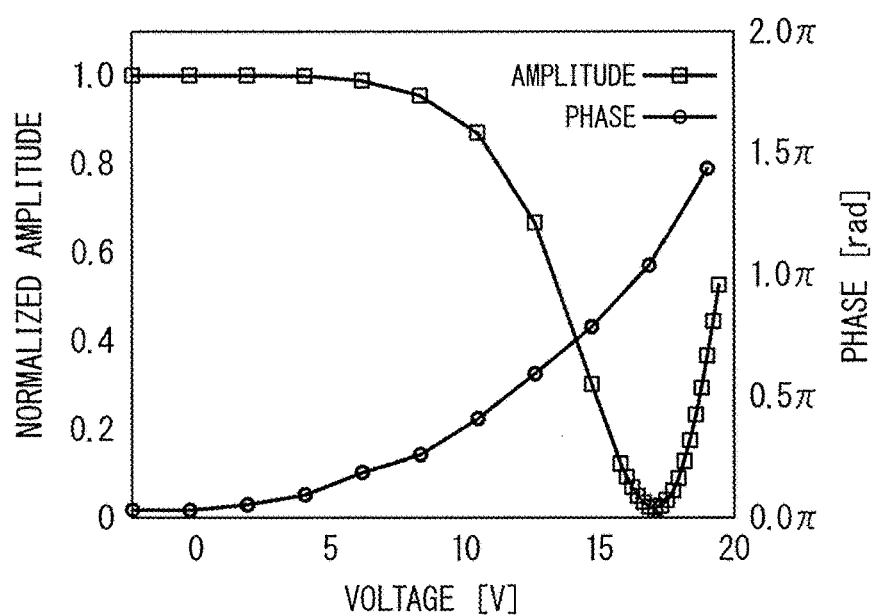
FIG. 11 is a graph illustrating changes in the normalized amplitude of a 0th-order light emitted from a virtual pixel included in the light sheet fluorescence microscope of the first embodiment, according to a voltage applied to the virtual pixel.

FIG. 11 is a graph illustrating changes in the normalized amplitude and phase of the 0th-order light emitted from a virtual pixel included in the light sheet fluorescence microscope of the first embodiment, according to a voltage applied to the virtual pixel. FIG. 11 is obtained by experiment.

FIG. 11 reveals that amplitude modulation provides a contrast ratio of 1:45 and phase modulation provides a phase shift of 0 to about 4.4 radians.

The creation of a reconstructed image $I_{SI}$ that is performed during structured illumination requires a phase shift of $4/3\pi$ or 4.2 radians. When a phase shift of about 4.4 radians is achieved, thus, the creation of a reconstructed image $I_{SI}$ is created appropriately.

18. Demonstration 1 of Removal of Background by Structured Illumination

To reduce scattering and aberrations due to mismatched refractive indices, samples containing fluorescent beads confined in agarose gel that is very close in refractive index to water were prepared as samples 1040. The agarose gel was prepared by heating and solidifying 1% liquid agarose solution. The nominal diameter of a single fluorescent bead is 0.2 μm.

Subsequently, inverted images of the sample 1040 when structured illumination was performed and when structured illumination was not performed were achieved by the light sheet fluorescence microscope 1000 of the first embodiment.

The thickness of the created light sheet was about 12 µm at full width at half maximum. The effective field of view was 340 µm by 271 µm. The created structured light sheet 1620 had an intensity distribution period of 8.9 µm. The period 8.9 µm is the longest period achieved by causing two adjacent light sheets to interfere with each other. Although a shorter period can be achieved by increasing an angle between two light sheets that are caused to interfere with each other, the period 8.9 µm was chosen to increase the intensity of the signal in this demonstration.

Figure 12A:
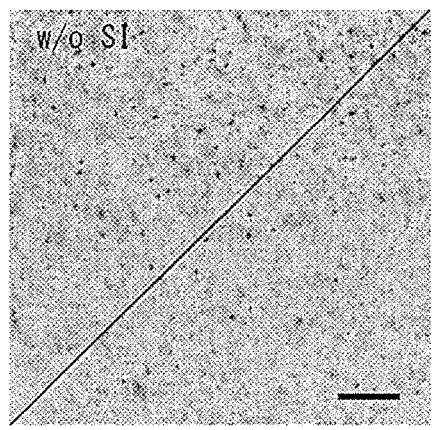
FIGS. 12A, 12B, 12C, 12D, and 12E each illustrate an image of a sample acquired by the light sheet fluorescence microscope of the first embodiment.
Figure 12B:
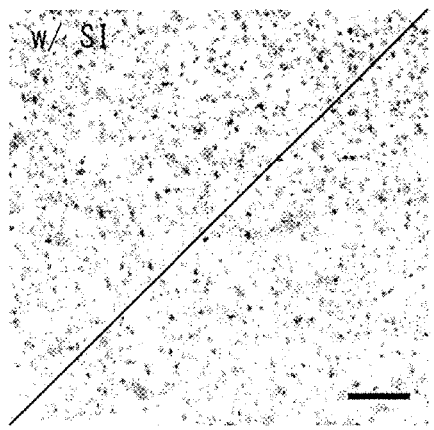
Figure 12C:
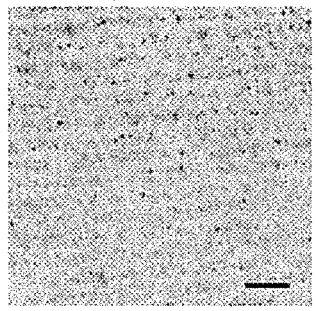
Figure 12D:
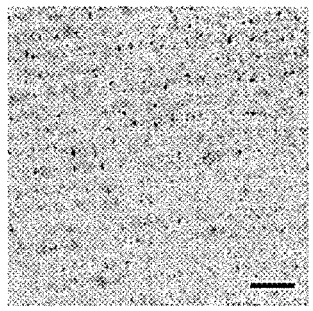
Figure 12E:
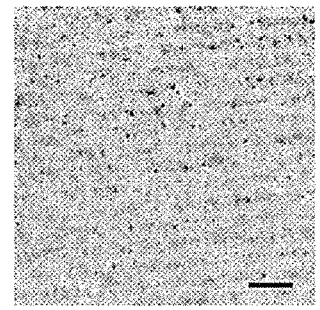

FIGS. 12A, 12B, 12C, 12D, and 12E each illustrate an image of a sample acquired by the light sheet fluorescence microscope of the first embodiment. FIG. 12A illustrates a final image acquired when structured illumination was not performed. FIG. 12B illustrates a final image acquired when structured illumination was performed. FIGS. 12C, 12D, and 12E respectively illustrate raw images $I_1$, $I_2$, and $I_3$ acquired when structured illumination was performed and phase differences $\phi$ were 0, $2/3\pi$, and $/3\pi$. The final image illustrated in FIG. 12B is a reconstructed image $I_{SI}$ created by combining the raw images illustrated in FIGS. 12C, 12D, and 12E by image processing expressed by Equation (2). The scale bar illustrated in each of FIGS. 12A to 12E indicates a length of 20 µm.

Figure 13:
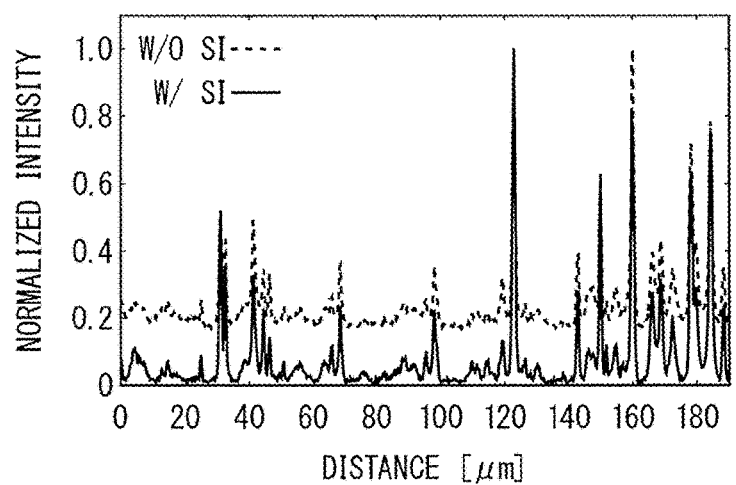
FIG. 13 is a graph illustrating changes in the normalized intensity according to a distance in an image acquired by the light sheet fluorescence microscope of the first embodiment.
Figure 14A:
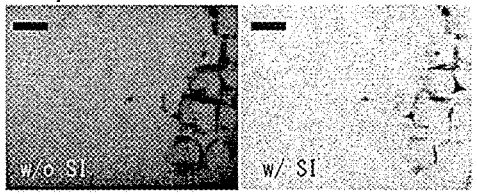
FIGS. 14A, 14B, 14C, 14D, and 14E each illustrate an optically sectioned image of a GFP-labeled mouse adipose tissue acquired by the light sheet fluorescence microscope of the first embodiment.
Figure 14D:
Figure 14B:
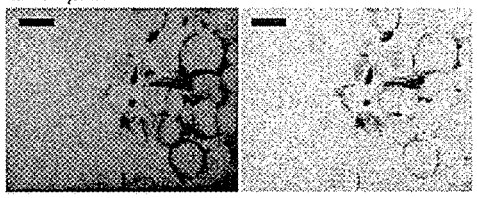
Figure 14E:
Figure 14C:
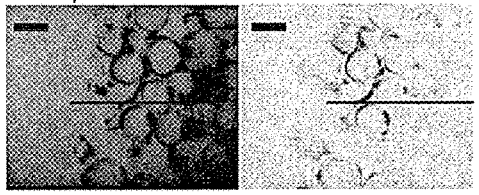

FIG. 13 is a graph illustrating changes in the normalized intensity according to a distance in an image acquired by the light sheet fluorescence microscope of the first embodiment. The broken line illustrated in FIG. 13 indicates changes along the line illustrated in FIG. 12A. The solid line illustrated in FIG. 13 indicates changes along the line illustrated in FIG. 12B.

The comparison between FIGS. 12A and 12B and the comparison between the broken line and the solid line illustrated in FIG. 13 reveal that the intensity of the background light when structured illumination was performed and image reconstruction was performed is about a tenth of the intensity obtained when structured illumination was not performed and that the contrast of the final image when structured illumination was performed and image reconstruction was performed is higher than the contrast obtained when structured illumination was not performed.

19. Demonstration 2 of Removal of Background by Structured Illumination

Separately from the above demonstration using fluorescent beads, samples containing green fluorescent protein (GFP)-labeled mouse adipose tissue confined in agarose gel were prepared as samples 1040. The prepared samples had a volume of about 8 mm³.

Subsequently, optically sectioned images of the GFP-labeled mouse adipose tissue when structured illumination was not performed and when structured illumination was performed were acquired for each of a plurality of positions in the Z direction by the light sheet fluorescence microscope 1000 of the first embodiment.

FIGS. 14A, 14B, 14C, 14D, and 14E each illustrate an optically sectioned image of a GFP-labeled mouse adipose tissue acquired by the light sheet fluorescence microscope of the first embodiment. FIGS. 14A to 14E illustrate inverted images when structured illumination was not performed and when structured illumination was performed, where Z is 0, 15, 30, 45, and 50 µm, respectively. Each of FIGS. 14A to 14E illustrates an optically sectioned image when structured illumination was not performed on the left and illustrates an optically sectioned image when structured illumination was performed on the right. The scale bar illustrated in each of FIGS. 14A to 14E indicates a length of 50 µm.

Figure 15:
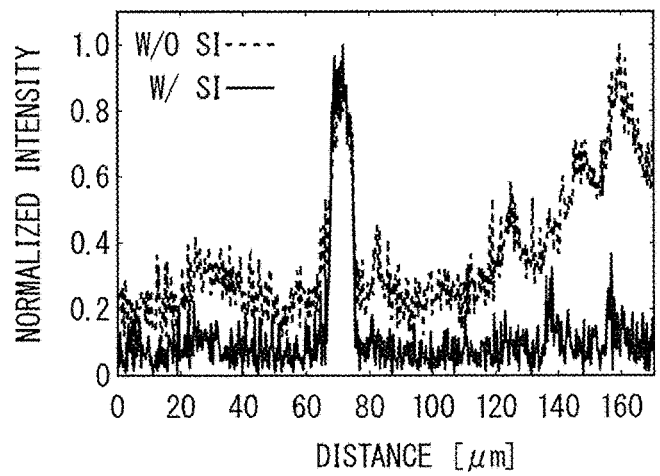
FIG. 15 is a graph illustrating changes in the normalized intensity according to a distance in an optically sectioned image acquired by the light sheet fluorescence microscope of the first embodiment.

FIG. 15 is a graph illustrating changes in the normalized intensity according to a distance in an optically sectioned image acquired by the light sheet fluorescence microscope of the first embodiment. The broken line illustrated in FIG. 15 illustrates changes along the line illustrated in the optically sectioned image on the left of FIG. 14C. The solid line illustrated in FIG. 15 illustrates changes along the line illustrated in the optically sectioned image on the right of FIG. 14C.

The comparison between the broken line illustrated in FIG. 15 and the solid line illustrated in FIG. 15 reveals that the intensity of the background light when structured illumination was performed and image reconstruction was performed is dramatically lower than intensity obtained when structured illumination was not performed and that the contrast of the final image when structured illumination was performed and image reconstruction was performed is higher than the contrast obtained when structured illumination was not performed.

In each of FIGS. 14A to 14E, the comparison between the optically sectioned image on the left and the optically sectioned image on the right reveals that not only in focus features are imaged but also out focus features are subject to imaging when structured illumination was not performed, while in focus features are imaged but out focus features are less subject to imaging when structured illumination was performed.

Figure 16:
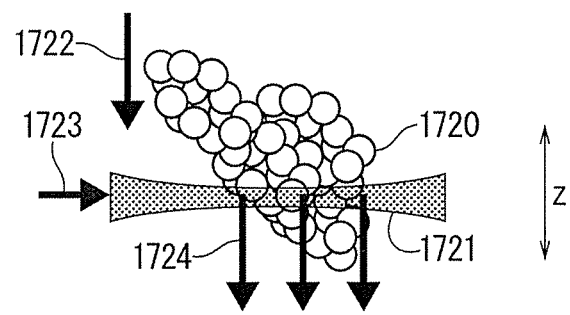
FIG. 16 is a schematic diagram illustrating a mechanism of translation when the light sheet fluorescence microscope of the first embodiment acquires an optically sectioned image of a GFP-labeled mouse adipose tissue.

FIG. 16 is a schematic diagram illustrating a mechanism of translation when the light sheet fluorescence microscope of the first embodiment acquires an optically sectioned image of a GFP-labeled mouse adipose tissue. FIG. 16 illustrates a mouse adipose 1720 and a light sheet 1721 that is excitation light and also illustrates an arrow 1722 indicating the direction of the translation of the sample 1040, an arrow 1723 indicating the propagation direction of the light sheet 1721, and an arrow 1724 indicating the propagation direction of fluorescence to be detected. When the sample translation illustrated in FIG. 16 is performed, the surface of the mouse adipose 1720 is tilted from the propagation direction of the light sheet 1721. This causes the portion of the mouse adipose 1720 that is illuminated when the mouse adipose 1720 is translated in the Z direction to move from the left to the right in FIG. 16.

20. Demonstrations of Suppression of Shadow by Pivoting Illumination

The optically sectioned images of the GFP-labeled mouse skeletal muscle when pivoting illumination was not performed and when pivoting illumination was performed were acquired by the light sheet fluorescence microscope 1000 of the first embodiment. When pivoting illumination was performed, the GFP-labeled mouse skeletal muscle was illuminated by seven light sheets having different propagation directions. The angle between two adjacent light sheets is about 1.15 degrees. The switching frequency of the GLV 1180 was set to 13.5 kHz such that switching through seven light sheets is accomplished in 0.52 milliseconds. Since this switching time is less than the camera capture time, 50 milliseconds, averaging is performed automatically.

Figure 17A:
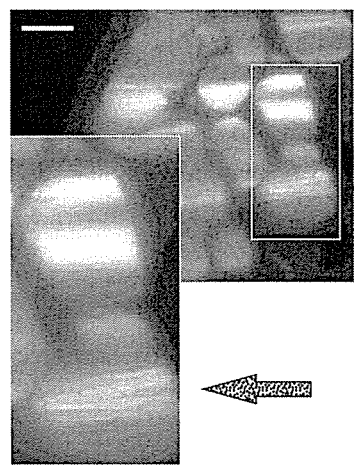
FIGS. 17A and 17B each illustrate an optically sectioned image of a GFP-labeled mouse skeletal muscle acquired by the light sheet fluorescence microscope of the first embodiment.
Figure 17B:
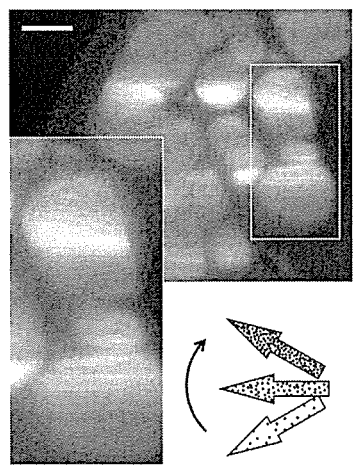

FIGS. 17A and 17B each illustrate an optically sectioned image of a GFP-labeled mouse skeletal muscle acquired by the light sheet fluorescence microscope of the first embodiment. FIG. 17A is an optically sectioned image acquired when pivoting illumination was not performed. FIG. 17B is an optically sectioned image acquired when pivoting illumination was performed. The scale bar illustrated in each of FIGS. 17A and 17B indicates a length of 50 µm.

The comparison between the optically sectioned image illustrated in FIG. 17A and the optically sectioned image illustrated in FIG. 17B reveals that a stripe-shaped shadow is suppressed more when pivoting illumination was performed than when pivoting illumination was not performed.

While the invention has been described in detail, the foregoing description is in all aspects illustrative and not restrictive. It is understood that numerous other modifications and variations can be devised without departing from the scope of the invention.

What is claimed is:

1. A converter for converting a line light into a structured light sheet or a pivoting light sheet, said converter comprising:
a spatial light modulator including first to n-th pixels, wherein n is an integer greater than or equal to 2, said first to n-th pixels respectively include first to n-th groups of sub-pixels, each group of sub-pixels comprises reflection surfaces, first to n-th lights are emitted respectively from said first to n-th pixels when a line light enters said first to n-th pixels, said first to n-th lights respectively include first to n-th specific-order lights, and intensities and phases of said first to n-th specific-order lights respectively depend on arrangements of said first to n-th groups of sub-pixels;
an optical system that extracts said first to n-th specific-order lights respectively from said first to n-th lights and converts said first to n-th specific-order lights respectively into first to n-th light sheets to create the first to n-th light sheets at a portion to be illuminated; and
a controller that performs processing of controlling the arrangements of said first to n-th groups of sub-pixels such that a structured light sheet or a pivoting light sheet is created at said portion to be illuminated, an arrangement of said each group of sub-pixels comprises an arrangement when no modulation is performed in which said reflection surfaces are positioned at first positions that are flush with each other, an arrangement when phase modulation is performed in which said reflection surfaces are displaced from said first positions and are flush with each other, and an arrangement when amplitude modulation is performed in which said reflection surfaces create a periodic roughness.

2. The converter according to claim 1, wherein said processing includes first processing of controlling the arrangements of said first to n-th groups of sub-pixels such that i1-th and i2-th specific-order lights are emitted at a time respectively from i1-th and i2-th pixels that are two pixels included in said first to n-th pixels to create said structured light sheet at said portion to be illuminated.

3. The converter according to claim 2, wherein said first processing controls arrangements of i1-th and i2-th groups of sub-pixels such that a phase difference between said i1-th and i2-th specific-order lights changes during said i1-th and i2-th specific-order lights are emitted respectively from said i1-th and i2-th pixels.

4. The converter according to claim 1, wherein said processing includes second processing of controlling the arrangements of said first to n-th groups of sub-pixels such that a j1-th specific-order light is emitted from a j1-th pixel that is one pixel included in said first to n-th pixels and said j1-th pixel is switched in a cyclical fashion to create said pivoting light sheet at said portion to be illuminated.

5. The converter according to claim 1, wherein
said first to n-th specific-order lights are respectively first to n-th 0th-order lights, and
said processing controls, when causing a k-th 0th-order light to be emitted from a k-th pixel included in said first to n-th pixels, arrangements of a k-th group of sub-pixels such that said k-th group of sub-pixels do not form a diffraction grating, and controls, when causing said k-th 0th-order light not to be emitted from said k-th pixel, the arrangements of said k-th group of sub-pixels such that said k-th group of sub-pixels form a diffracting grating.

6. The converter according to claim 1, wherein
said first to n-th specific-order lights are respectively first to n-th first-order diffracted lights, and
said processing controls, when causing a k-th first-order diffracted light to be emitted from a k-th pixel included in said first to n-th pixels, arrangements of a k-th group of sub-pixels such that said k-th group of sub-pixels form a diffraction grating, and controls, when causing said k-th first-order diffracted light not to be emitted from said k-th pixel, the arrangements of said k-th group of sub-pixels such that said k-th group of sub-pixels do not form a diffracting grating.

7. The converter according claim 1, wherein
an i-th group of sub-pixels respectively include an i-th group of reflection surfaces that reflect said line light, where i is each of integers from 1 to n, and
said processing controls, when changing a phase of an m-th specific-order light emitted from an m-th pixel included in said first to n-th pixels, arrangements of an m-th group of sub-pixels such that positions of said m-th group of sub-pixels change for a direction perpendicular to an m-th group of reflection surfaces.

8. The converter according to claim 1, wherein said optical system includes
a Fourier transform lens that causes said first to n-th lights to pass therethrough and guides said first to n-th specific-order lights to a common position,
a spatial filter with a pass-through portion that is arranged at said common position and selectively causes said first to n-th specific-order lights to pass therethrough,
an inverse Fourier transform lens that causes said first to n-th specific-order lights to pass therethrough and said first to n-th specific-order lights to travel in a common direction after said first to n-th specific-order lights pass through said pass-through portion,
first to n-th cylindrical lenses that respectively cause said first to n-th specific-order lights to pass therethrough and respectively focus said first to n-th specific-order lights after said first to n-th specific-order lights pass through said inverse Fourier transform lens, and
an objective lens that causes said first to n-th specific-order lights to pass therethrough and guides said first to n-th specific-order lights to said portion to be illuminated after said first to n-th specific-order lights respectively pass through said first to n-th cylindrical lenses.

9. The converter according to claim 1, wherein
said spatial light modulator comprises a grating light valve, and
an i-th group of sub-pixels respectively include an i-th group of ribbons that reflect said line light, and arrangements of said i-th group of sub-pixels are arrangements of said i-th group of ribbons, where i is each of integers from 1 to n.

10. An illuminator for creating a structured light sheet or a pivoting light sheet, said illuminator comprising:
- the converter according claim 1;
- a light source that emits a coherent light; and
- an anamorphic optical system that converts said coherent light into said line light.

11. A light sheet fluorescence microscope comprising:
- the illuminator according to claim 10; and
- an imaging device that images a section of a sample illuminated by said structured light sheet or said pivoting light sheet.

* * * * *